Feb. 24, 1959　　　　F. C. KELTON　　　　2,874,565
POROSIMETER AND METHOD OF MEASURING POROSITY
Filed Dec. 6, 1955
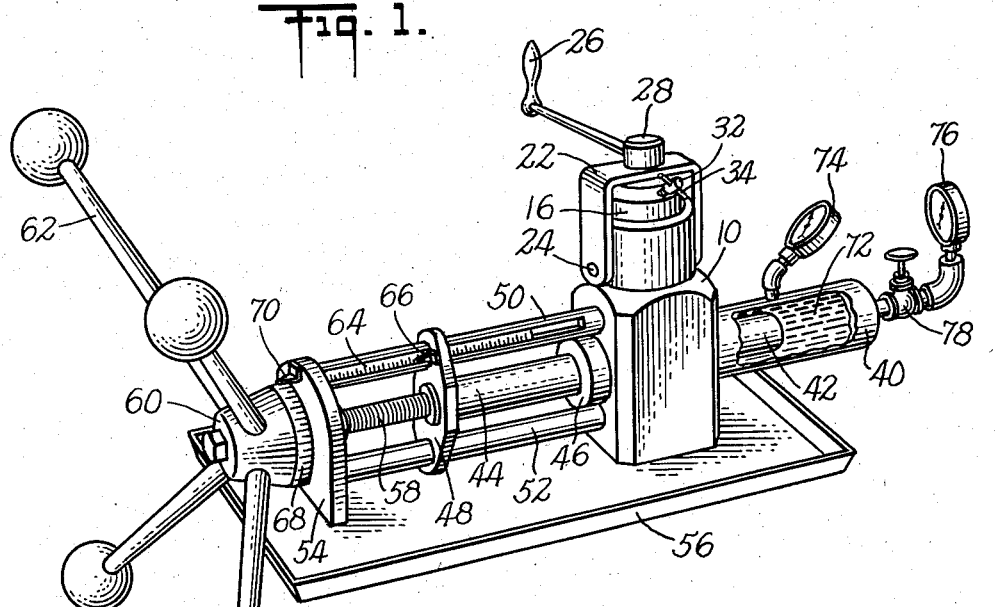
INVENTOR
*Frank C. Kelton*
BY
*Curtis, Morris & Safford*
ATTORNEYS

United States Patent Office 2,874,565
Patented Feb. 24, 1959

2,874,565

POROSIMETER AND METHOD OF MEASURING POROSITY

Frank C. Kelton, Dallas, Tex., assignor to Core Laboratories, Inc., Dallas, Tex., a corporation of Texas Application December 6, 1955, Serial No. 551,333

8 Claims. (Cl. 73—38)

This invention relates to an apparatus and method for measuring the porosity of oil well core samples and other porous solids.

In exploration and development work for underground reservoirs of petroleum or natural gas, to ascertain the reservoir volume and productive capacity of such reservoirs and to determine proper production practices, it is necessary to obtain a measurement of the porosity of core samples of the reservoir formation. A number of methods of porosity measurement have heretofore been used, with varying efficacy.

One of the crudest methods of porosity measurement involves first measuring the bulk volume of the consolidated core sample, then breaking the sample down to individual sand grains and measuring the total volume of the grains. The difference between the two measurements is, of course, the pore volume of the consolidated sample. The porosity is determined by dividing the pore volume by the bulk volume of the sample, the latter factor being determined independently before crushing of the sample, e. g. by calipering of the sample, if it is regularly shaped, or by liquid displacement, as in a pycnometer. This method is obviously cumbersome and is not used commercially to any significant extent.

Another relatively simple method of porosity determination involves first weighing the dry sample, then fully saturating it with liquid and reweighing it. The difference between the unsaturated and saturated weights of the sample, divided by the density of the saturant, gives the pore volume. The porosity of the sample is calculated from its pore volume and its bulk volume, as described above. This method involves inaccuracies due to the difficulty of obtaining complete saturation of the core sample. Errors are also introduced by evaporation of the saturant and by swelling of the matrix material.

A slightly modified method involves first weighing the core, saturating it with liquid and reweighing it, when suspending it in a vessel of the saturating liquid and weighing it a third time. Employing Archimedes' principle, the porosity can be directly determined by dividing the difference between the first two weights (which equals the weight of the saturating liquid within the sample) by the difference between the latter two weights (which equals the loss in weight of the saturated core when suspended in the liquid or the weight of the displaced liquid). This method has the advantage that the bulk volume does not have to be independently determined, but it is subject to all of the other disadvantages inherent in the saturation method of porosity measurement.

Another method of porosity measurement is based upon Boyle's law. This method involves reduction of pressure to which the core sample is subjected, while maintaining the temperature constant, thereby allowing the gas within the core sample to expand. The initial pressure, the pressure after expansion, and the volume after expansion are measured. By a mathematical calculation in accordance with Boyle's law, the volume of the gas at atmospheric pressure may be calculated, employing a correction factor to allow for the expansion of extraneous gas within the measuring equipment. The original volume of the pore gas is of course equal to the pore volume of the sample. This method has the disadvantage that the temperature must be maintained constant within very narrow limits due to the relatively large volume of gas involved. Appreciable errors are introduced because of the adsorption of gases by the test apparatus. Moreover, any error involved in the independent measurement of the bulk volume of the sample is compounded in the computation of porosity.

The method of porosity determination which is probably in most widespread commercial use today is that covered by U. S. Patent No. 2,327,642 issued August 24, 1943. This method involves forcing a non-compressible liquid into the pore space of the sample at high pressure to compress and displace the gas therein. The liquid employed is preferably one having sufficiently high surface tension that it does not "wet" the core sample or enter its pores at atmospheric pressure. The bulk volume of the core sample therefore may be conveniently measured by noting the amount of liquid displaced when the core sample is first immersed in it. The pressure of the liquid is then increased, for example, to 50 atmospheres, causing the liquid to enter the pore spaces of the sample and compress the gas to $\frac{1}{50}$ (i. e. 2 percent) of its normal volume. The volume of liquid thus entering the pore spaces is measured and this volume is increased by 2 percent (the volume of the compressed gas in the pore spaces) to give the total pore volume. The method is most commonly employed on "wet" samples—i. e. samples from which the interstitial oil and water have not been extracted. The figure thus obtained is therefore a measure not of the total pore volume but only of the volume of the gas in the pore spaces. The total pore volume is computed, according to the method covered by U. S. Patent No. 2,345,535 issued March 28, 1944, by adding to the gas volume the volume of the interstitial oil and water, which is determined separately, for example by distillation.

This method may involve some inaccuracy because of the capillary resistance encountered in forcing the mercury into the fine pores of the sample. The method also results in contaminating the sample so that it cannot be used for further analysis. Moreover, a certain amount of mercury is either expended in the sample or must be recovered by a prolonged distillation procedure involving some hazard due to the noxious character of the mercury vapor. Finally, because of the high pressures involved, the apparatus must be of heavy-weight construction and is comparatively expensive.

Another method of porosity determination which has been used commercially to an appreciable extent is the so-called Washburn-Bunting method. This method involves vacuum extraction of the gas from the sample, for example, by means of a mercury levelling bulb. The evolved gas is transferred to a burette where it is restored to atmospheric pressure and its volume measured. The evacuation procedure must be repeated several times in order to achieve acceptable accuracy. Even then, because of the fact that evacuation is produced by expansion, it is impossible to remove absolutely all of the gas from the sample. This method involves the additional disadvantage that the bulk volume of the core sample must be determined by independent means. Moreover, the evolved gas is exposed to relatively large areas of the measuring apparatus, permitting adsorption errors.

The present invention provides a method and apparatus for measurement of the free gas volume or porosity of core samples which avoids most of the limitations and disadvantages referred to hereinabove as inherent in previous systems of measurement. In general terms, the method involves immersing the sample in a non-wetting liquid, such as mercury, within a closed chamber, first noting the displacement of the mercury at atmospheric pressure as a measure of the bulk volume of the sample, then reducing the pressure of the mercury to a predetermined fraction of atmospheric pressure by expanding the size of the chamber, thereby allowing the gas in the sample to expand and partially evolve therefrom, measuring the volume of gas thus evolved from the sample while maintaining the liquid and the gas at the reduced pressure, and calculating the pore volume of the sample on the basis of the volume of evolved gas and the ratio of the reduced pressure to atmospheric pressure. For example, if the pressure is reduced to one-half of atmospheric pressure, the gas within the core sample expands to twice its original volume, one-half of the gas remaining in the core sample and one-half evolving from the sample. The volume of the evolved gas is thus equal to the pore volume of the sample.

Preferably, the atmospheric pressure is not measured at all, but the apparatus is calibrated previous to the test by introducing a known volume of air into the sample chamber, reducing the pressure to a predetermined level as indicated by a vacuum gauge (for example, a pressure of approximately ½ atmosphere), noting the volume of the air at this reduced pressure, and calculating an expansion factor equal to the ratio of the increase in volume to the original volume. In subsequently analyzing a sample, the pressure is reduced to the same level and the pore volume of the sample is calculated by dividing the volume of gas evolved from the sample by the expansion factor.

In the drawing:

Figure 1 is a somewhat diagrammatic perspective view of an apparatus embodying certain features of the invention, by which the method of the invention may be carried out, with the apparatus shown partially broken away to reveal its inner construction.

Figure 2 is an enlarged transverse, vertical sectional view through the sample chamber of the apparatus shown in Figure 1.

The particular apparatus shown in Figures 1 and 2 is generally similar in many details of its construction to the apparatus disclosed in and covered by the aforementioned Patent No. 2,327,642, except for certain differences which will be specifically referred to hereinafter.

As may be seen in the drawings, this apparatus includes a block 10 which is holowed out in its upper portion to provide a sample chamber 12 of sufficient internal valume to receive a conveniently sized sample 14 of core material. The sample chamber 12 is closed at its upper end by means of a cap 16 which is provided with an O-ring gasket 18 to form a fluid-tight joint with the block 10. The cap 16 is held in positon on top of the block by means of a pressure screw 20, the enlarged head of which bears against the flattened upper surface of the cap and the shank of which is threaded through a heavy bail 22 which is pivotally attached at either side of the block 10 by means of bolts 24 (Figure 1). The pressure screw 20 is rotated by means of a crank 26, the hub 28 of which is secured to the upper shank of the pressure screw 20 by a set screw 30.

The inner surface 16a of the cap 16 is concavely conical in shape and at its apex there is a small opening 16b which may be closed by a needle valve 32 threaded through the cap 16 and provided at its outer end with a crossbar 34 to serve as a finger grip. A bore 16c extends from the opening 16b through the opposite side of the cap 16 to permit the operator to observe the opening 16b.

The bottom surface 12b of the sample chamber 12 is also concavely conical in shape and at its apex is joined by a passageway 36 which extends upwardly from a generally cylindrical reservoir chamber 38 which is formed in the lower portion of the block 10 and which extends rearwardly into a tubular extension 40. As shown in Figure 1, a piston 42 extends into the reservoir chamber 38. This piston is actuated by means of a hollow rod 44 (Figure 1) which extends through a packing gland 46 at the forward side of the block 10. Secured at the forward end of the hollow rod 44 is a crosshead 48 which is slidably supported on a pair of parallel rods 50 and 52 which are attached at their rearward ends to the block 10 and at their forward ends to a bracket 54 which, like the block 10, rests on a tray 56.

Threaded through a tapped hole in the crosshead 48 and with its rearward end extending into the hollow rod 44 is a lead screw 58 the forward end of which extends rotatably through the bracket 54 and has fixed thereon the hub 60 of a hand wheel 62. Rotation of the hand wheel 62 rotates the lead screw 58 and causes the crosshead 48, rod 44 and piston 42 to move forwardly or rearwardly. Mounted on the upper guide rod 50 for sliding adjustment longitudinally thereof is a graduated scale 64 which cooperates with a pointer 66 on the crosshead 48 to indicate the longitudinal position of the piston 42. An adjustable vernier scale 68 extends around the hub 60 of the hand wheel 62 and cooperates with a pointer 70 on the bracket 54 to give a fine reading of the position of the piston 42.

The reservoir chamber 38 is filled with a suitable liquid 72 such as mercury having a surface tension sufficiently high to prevent its entering the pores of the core sample 14 at atmospheric pressure. When the hand wheel 62 is rotated so as to cause the piston 42 to move rearwardly and further inwardly into the tubular extension 40, mercury is forced up through the passageway 36 and into the sample chamber 12.

Mounted on the tubular extension 40 and communicating with the reservoir chamber 38 is a conventional mercury pressure gage 74, for example of the Bourdon-tube type, having a range extending upwardly at least to the order of approximately 750 pounds pressure—i. e., approximately 50 atmospheres. Mounted at the rearward end of the tubular extension 40 is a vacuum gage 76 which communicates with the reservoir chamber through a high pressure valve 78. This vacuum gage 76 preferably has sufficient range to indicate pressures at least as low as ½ atmosphere—i. e., a vacuum of approximately 15 or 16 inches of mercury.

The method of measuring porosity of core samples with this apparatus is as follows:

The core sample 14 is sized and shaped to fit within the sample chamber 12 and is trimmed to eliminate any pits and cavities on its surface which might retain air bubbles. The liquid contents of the core sample are then extracted and the sample is dried.

Before placing the sample 14 in the sample chamber 12, the cap 16 is first placed on top of block 10, the bail 22 is swung into vertical position over the cap 16 and the handle 26 is turned to bring the pressure screw 20 forceably down against the top of the cap to secure the cap in place and cause the gasket 18 to form a tight seal with the block 10. The needle valve 32 is turned to open the hole 16b in the cap 16. Then, as the operator observes through the bore 16c, the hand wheel 62 is turned to drive the piston 42 inwardly and force mercury up into the sample chamber to the point where the surface of the mercury first appears at the opening 16b. The scales 64 and 68 are then set for zero and the hand wheel 62 is turned in the reverse direction to lower the level of the mercury in the sample chamber 12 sufficiently to permit the sample 14 to be inserted into the sample chamber. The cap 16 is then replaced and tightened, and the hand wheel 62 is again turned to drive the piston 42 inwardly and flood the sample chamber 12 with mercury to the point where the mercury again appears in the opening 16b. The scales 64 and 68 will then read the bulk volume of the sample 14 (the difference in the internal volume of the reservoir chamber 38 with and without the core sample 14 in place in the sample chamber 12).

The needle valve 32 is now closed to seal the sample chamber 12, and the hand wheel 62 is turned to withdraw the piston 42 a short distance out of the reservoir chamber 38. This has the effect of creating a vacuum in the reservoir chamber 38 and sample chamber 12, the degree of vacuum being indicated by the vacuum gage 76.

The reduction in the pressure of the system allows the gas contained within the pore spaces of the sample 14 to expand and fill the void created by withdrawal of the piston 42. If the pressure in the fluid reservoir is reduced to 1/2 of atmospheric pressure, the gas within the pore spaces of the sample expands to twice its normal volume so that the amount of gas evolved from the core sample approximately equals the amount of gas remaining in the sample, in other words, the pore volume of the sample. If the vacuum gage 76 reads exactly 1/2 of atmospheric pressure, the scales 64 and 68 will therefore indicate the pore volume of the sample.

As will be understood, the fraction of the total gas which is evolved from the sample is the complement of the fractional atmospheric pressure to which the sample is subjected. For example, if the pressure is reduced to 1/3 atmosphere, the gas will expand to three times its normal volume and two-thirds of the total gas will be evolved.

By measuring the volume of the evolved gas and multiplying this volume by the reciprocal of the complement of the fractional pressure imposed, the total gas volume at the reduced pressure can be ascertained. For example, if the pressure is reduced to 1/3 atmosphere, the volume of the evolved gas is multiplied by 3/2 (the reciprocal of 2/3, which is the complement of 1/3) to give the total gas volume at the reduced pressure. The volume of the gas remaining in the sample, which is, of course, equal to the pore space of the sample, may then be determined by subtracting the volume of the evolved gas from the total gas volume.

In actual practice, it is preferable instead of attempting to reduce the pressure in the system to a known fraction of atmospheric pressure, to create some arbitrary degree of vacuum (e. g. 16 inches of mercury) and compare the measured expansion to that of a known volume of gas which has been subjected to the same degree of vacuum. This is done because the vacuum gage scale cannot be read accurately between divisions and because it is more reliable to depend upon the reproducibility of the gage rather than upon its accuracy of calibration.

Prior to running a set of samples, a brief calibration procedure is performed to obtain a calibration factor which is used for this set of samples. This calibration procedure is as follows: The high-pressure valve 78 is opened and the hand wheel 62 is turned to run the piston 42 inwardly to the point where the surface of the mercury just appears at the opening 16b in the cap 16. The scales 64 and 68 are then set to zero. The pointer of the vacuum gage 76 is also zeroed in the event it happens to be off calibration. The needle valve 32 is then closed to seal the sample chamber 12 and the hand wheel 62 is turned to withdraw the piston until the vacuum gage 76 indicates a vacuum of 16 inches of mercury. Since there is no gas in the system at this time, the hand wheel 62 will have to be moved only a very slight distance in order to create the indicated degree of vacuum. The required movement of the hand wheel is dependent upon the amount of "give" or inaccuracy in the system, and constitutes a correction factor which is recorded, with the designation "C," and is subtracted from the expansion readings subsequently taken.

The needle valve 32 is then opened and the hand wheel is turned until the scales 64 and 68 read 5.00 cc., indicating that 5.00 cc. of air has been introduced into the sample chamber. The needle valve 32 is then closed again and the hand wheel 62 is turned to withdraw the piston 42 until the vacuum gage 76 indicates a vacuum of 16 inches of mercury. The scales 64 and 68 are then read and this value is recorded with the designation "R." This factor "R" is an indication of the degree of expansion of a 5 cc. sample of gas when the pressure is reduced from atmospheric to the arbitrary reference level. The calibration factor "F" is then calculated from the equation $$F = \frac{5.00}{R - C - 5.00}$$

Five cubic centimeters of air is chosen as the standard of comparison because this is the volume of gas in a dried core sample having a typical porosity of 20 percent and a bulk volume of 25 cc., which is the average size of the samples used in the apparatus.

By way of example, the factor "R" may be of the order of 10.52 and the reading "C" may be 0.18. Thus, the calibration factor "F" is equal to $$\frac{5.00}{10.52 - 0.18 - 5.00} = \frac{5.00}{5.34} = 0.937$$

As will be understood, this calibration factor will always be near unity where the reference pressure is approximately 1/2 atmosphere, since the ratio between the expansion and the original volume is approximately 1:1.

The needle valve 32 is then opened, the cap 16 is removed and the sample 14 is inserted. The cap 16 is replaced and the hand wheel 62 is turned to move the piston 42 inwardly and flood the sample chamber 12 with mercury until its surface appears at the opening 16b. The bulk volume of the sample is then read from the scales 64 and 68. The scales 64 and 68 are then reset to zero and the needle valve 32 is closed. The hand wheel 62 is then turned to withdraw the piston 42 until the vacuum gage 76 reads 16 inches. An interval of time is then permitted to elapse until the reading of the vacuum gage 76 becomes constant, allowing time for the gas in the core sample to fully expand and reach equilibrium. In the case of extremely "tight" samples—i. e., samples having very low permeability—it may require as much as two or three minutes of sufficient gas to "bleed" out of the sample to allow the pressure within the sample to reach that of the surrounding mercury. When equilibrium is reached, the volume is read from the scales 64 and 68. This volume is corrected by subtracting the correction factor "C." The pore volume of the sample then may be computed by multiplying this evolved volume by the calibration factor "F," which has been determined as above described. The porosity of the sample then may be determined by dividing the pore volume by the bulk volume of the sample, which has been measured as above described.

From the foregoing description, it will be appreciated that the method of porosity measurement which is described has the following advantages over previous methods:

(1) It does not require that the barometric pressure be measured, since the effect of any changes in barometric pressure at the time of making a determination is automatically taken into account in obtaining the calibration factor.

(2) The method is rapid in that only few operations are required and the calculations are extremely simple, involving only the multiplication of a measured volume by a calibration factor near unity.

(3) It is not necessary to measure the temperature of the expanded gas since the sample and the expanded gas at the pressure reduction are rapidly brought to and maintained at the temperature of the mercury with which they are in contact.

(4) The accuracy obtainable is high since it does not depend upon the accuracy of calibration of the vacuum gage but only upon its reproducibility.

(5) There is no air in the system other than that within the sample itself.

(6) The bulk volume of the sample is obtained substantially concurrently with the measurement of pore volume without transferring the sample to a separate apparatus.

(7) The procedure does not contaminate the sample, so that it may be used in subsequent measurements.

(8) Since no pressures higher than atmospheric are involved, the test apparatus may be of lightweight construction, and even glass may be employed.

The particular apparatus shown in the drawings and described hereinabove may be used not only for measurement of porosity by the vacuum method described, but this same apparatus may also be used for measurement of the gas volume of wet samples or the porosity of dry samples by the compression method disclosed and covered by the aforementioned Patent No. 2,327,642. When the apparatus is so used, the high-pressure valve 78 is closed to protect the vacuum gage 76. The apparatus thus becomes the substantial equivalent of that disclosed in said Patent No. 2,327,642.

It will therefore be appreciated that the present invention provides a method and apparatus for measurement of the porosity of oil well core samples which eliminates many of the disadvantages inherent in previous systems of porosity measurement. However, it should be emphasized that the particular method and apparatus disclosed herein are intended as merely illustrative of the invention rather than as restrictive thereof, and that this method and apparatus may be varied in accordance with different conditions and requirements without departing from the scope of the invention as defined by the appended claims.

I claim:

1. The method of measuring the pore space of a core sample occupied by gas which comprises immersing said sample in a liquid within an enclosed chamber, reducing the pressure of said liquid to a fraction of atmospheric pressure and allowing the gas in the pore space to expand and partially evolve from said sample, and measuring the volume of gas thus evolved from said sample while maintaining said liquid and said gas at said reduced pressure, as a complementary fractional measure of the total of the volume of said evolved gas and of the pore space of said sample occupied by gas.

2. The method of measuring the porosity of a dry core sample which comprises immersing, within an enclosed chamber, said sample in a liquid having a surface tension sufficiently high to prevent said liquid from entering the pore spaces of said sample at atmospheric pressure, measuring the volume of said liquid displaced by said core sample while maintaining said liquid substantially at atmospheric pressure as a measure of the bulk volume of said core sample, reducing the pressure of said liquid to a fraction of atmospheric pressure and allowing the gas in the pore space to expand and partially evolve from said sample, and measuring the volume of gas thus evolved from said sample while maintaining said liquid and said gas at said reduced pressure, as a complementary fractional measure of the total of the volume of said evolved gas and of the porosity of said sample.

3. The method of measuring the porosity of a core sample which comprises extracting the liquids from said core sample, drying said core sample, immersing, within an enclosed chamber, said sample in a liquid having a surface tension sufficiently high to prevent said liquid from entering the pore spaces of said sample at atmospheric pressure, measuring the volume of said liquid displaced by said core sample while maintaining said liquid substantially at atmospheric pressure as a measure of the bulk volume of said core sample reducing the pressure of said liquid to a fraction of atmospheric pressure and allowing the gas in the pore space to expand and partially evolve from said sample, and measuring the volume of gas thus evolved from said sample while maintaining said liquid and said gas at said reduced pressure, as a complementary fractional measure of the total of the volume of said evolved gas and of the porosity of said sample.

4. The method of measuring the pore space of a core sample occupied by gas which comprises immersing said sample in liquid in an enclosed chamber of variable volume entirely filled by said liquid and said sample at atmospheric pressure, increasing the volume of said chamber to reduce the pressure of said liquid to a fraction of atmospheric pressure and allowing the gas in the pore space to expand and partially evolve from said sample, and measuring the increase in volume of said chamber while maintaining said reduced pressure constant, as a measure of the volume of gas evolved from said sample and as a complementary fractional measure of the total of the volume of said evolved gas and of the pore space of said sample occupied by gas.

5. The method of measuring the pore space of a core sample occupied by gas which comprises filling a chamber of variable volume with a liquid having a surface tension sufficiently high to prevent said liquid from entering the pore spaces of said core sample at atmospheric pressure, increasing the volume of said chamber sufficiently to admit said core sample, immersing said core sample in said liquid within said chamber, filling said chamber with said liquid and said core sample substantially at atmospheric pressure, measuring the increase in volume of said chamber as a measure of the bulk volume of said core sample, enclosing said chamber, again increasing the volume of said chamber to reduce the pressure of said liquid to a fraction of atmospheric pressure and allowing the gas in the pore space to expand and partially evolve from said sample, and again measuring the increase in volume of said chamber while maintaining said reduced pressure constant, as a measure of the volume of gas evolved from said sample and as a complementary fractional measure of the total of the volume of said evolved gas and of the pore space of said sample occupied by gas.

6. The method of measuring the pore space of a core sample occupied by gas which comprises subjecting a gas of known initial volume to a degree of vacuum, and measuring its resulting expansion, immersing said core sample in a liquid within an enclosed chamber, subjecting said liquid to the same degree of vacuum to allow the gas in said core sample to expand and partially evolve from said core sample, and measuring the volume of gas thus evolved while subjected to said degree of vacuum as a measure of a quantity bearing the same ratio to the pore volume of said sample occupied by gas as the expansion of the first mentioned gas bears to its initial volume.

7. The method of measuring the pore space of a core sample occupied by gas which comprises placing liquid in a chamber of variable volume, expanding said chamber by a measured volume with its upper end vented to admit an equal volume of air, closing said chamber, further expanding said chamber, measuring the degree of vacuum thereby created and the proportional increase in volume of said air, opening said chamber, increasing the volume of said chamber sufficiently to permit insertion of said core sample, contracting said chamber to fill with said liquid the space in said chamber not occupied by said sample, closing said chamber, and expanding said chamber to the aforesaid degree of vacuum and measuring the increase in volume as a similar proportional measure of the pore space of said sample occupied by gas.

8. The method of measuring the gas saturation of a core sample which comprises filling a chamber of variable volume with a liquid having a surface tension sufficiently high to prevent said liquid from entering the pore spaces of said sample at atmospheric pressure, measuring the volume of said chamber when so filled as a measure of the volume of said liquid, expanding said chamber by a measured volume with its upper end vented to admit an equal volume of air, closing said chamber, further expanding said chamber, measuring the degree of vacuum thereby created and the proportional increase in volume of said air, opening said chamber, increasing the volume of said chamber sufficiently to permit insertion of said core sample, contracting said chamber to fill with said liquid the space in said chamber not occupied by said sample, measuring the volume of said chamber when so filled as measure of the total of the volume of said liquid and the bulk volume of said sample, closing said chamber, and expanding said chamber to the aforesaid degree of vacuum and measuring the increase in volume as a similar proportional measure of the pore space of said sample occupied by gas.

References Cited in the file of this patent

UNITED STATES PATENTS

| | | |
|---|---|---|
| 665,567 | Kemp | Jan. 8, 1901 |
| 2,327,642 | Horner | Aug. 24, 1943 |
| 2,537,668 | Hebard | Jan. 9, 1951 |
| 2,604,779 | Purcell | July 29, 1952 |
| 2,720,782 | Stein | Oct. 18, 1955 |
| 2,749,220 | Rochon | June 5, 1956 |